（12） United States Patent
Kim et al.

(10) Patent No.: US 8,787,469 B2
(45) Date of Patent: Jul. 22, 2014

(54) METHOD FOR CODEBOOK DESIGN AND BEAMFORMING VECTOR SELECTION IN PER-USER UNITARY RATE CONTROL (PU2RC) SYSTEM

(75) Inventors: Sung Jin Kim, Suwon-si (KR); Bruno Clerckx, Yongin-si (KR); Seung Young Park, Gwangiu (KR); David J. Love, West Lafayette, IN (US); Il Han Kim, Geumwang-eup (KR)

(73) Assignees: Samsung Electronics Co., Ltd., Suwon-si (KR); Purdue Research Foundation, West Lafayette, IN (US)

( * ) Notice: Subject to any disclaimer, the term of this patent is extended or adjusted under 35 U.S.C. 154(b) by 732 days.

(21) Appl. No.: 11/972,397

(22) Filed: Jan. 10, 2008

(65) Prior Publication Data

US 2008/0247475 A1 Oct. 9, 2008

Related U.S. Application Data

(60) Provisional application No. 60/910,068, filed on Apr. 4, 2007.

(30) Foreign Application Priority Data

Apr. 12, 2007 (KR) .................................. 2007-36170

(51) Int. Cl.
*H04K 1/10* (2006.01)
*H04L 27/28* (2006.01)

(52) U.S. Cl.
USPC ............. 375/260; 375/267; 455/69; 455/101; 455/562.1

(58) Field of Classification Search
USPC .................. 375/260, 267; 455/69, 101, 562.1
See application file for complete search history.

(56) References Cited

U.S. PATENT DOCUMENTS

| 5,258,980 | A | * | 11/1993 | Maebara et al. | ............... | 370/347 |
| 6,859,503 | B2 | | 2/2005 | Pautler et al. | | |
| 7,336,727 | B2 | * | 2/2008 | Mukkavilli et al. | ........... | 375/299 |
| 2003/0128769 | A1 | * | 7/2003 | Kim et al. | ..................... | 375/265 |

(Continued)

FOREIGN PATENT DOCUMENTS

| KR | 2001-36597 | 5/2001 |
| KR | 2001-95535 | 11/2001 |

(Continued)

OTHER PUBLICATIONS

Wang, J., "Beam Codebook based Beamforming Protocol for Multi-Gbps Millimeter-Wave WPAN Systems", 2009, Selected Areas in Commmunication, vol. 27, p. 1390-1399.*

(Continued)

*Primary Examiner* — Shuwang Liu
*Assistant Examiner* — Sung Ahn
(74) *Attorney, Agent, or Firm* — NSIP Law (57) ABSTRACT

A base station includes a storage unit to store a codebook, wherein the codebook includes a plurality of matrices; a control unit to perform beamforming using the codebook to generate a signal; and a multi-antenna to transmit the signal. For all of the plurality of matrices, all column vectors of a same matrix of the plurality of matrices are orthogonal to each other. For all columns of the plurality of matrices, all column vectors of a same column of all of the plurality of matrices satisfy a Grassmannian line packing (GLP) criterion.

12 Claims, 2 Drawing Sheets

(56) References Cited

U.S. PATENT DOCUMENTS

| | | |
|---|---|---|
| 2004/0127244 A1* | 7/2004 | Matsumoto et al. ........... 455/517 |
| 2005/0003768 A1* | 1/2005 | Laroia et al. ................... 455/101 |
| 2005/0265290 A1* | 12/2005 | Hochwald et al. ............. 370/335 |
| 2005/0286663 A1* | 12/2005 | Poon .............................. 375/347 |
| 2006/0067277 A1 | 3/2006 | Thomas et al. |
| 2006/0161432 A1* | 7/2006 | Zhang et al. ................... 704/238 |
| 2006/0164969 A1* | 7/2006 | Malik et al. .................... 370/203 |
| 2006/0209980 A1* | 9/2006 | Kim et al. ....................... 375/267 |
| 2007/0191066 A1* | 8/2007 | Khojastepour et al. .... 455/562.1 |
| 2007/0280386 A1* | 12/2007 | Waes et al. ..................... 375/347 |
| 2008/0003768 A1* | 1/2008 | Oh ................................. 438/399 |
| 2008/0299917 A1* | 12/2008 | Alexiou et al. ................ 455/103 |

FOREIGN PATENT DOCUMENTS

| | | |
|---|---|---|
| KR | 2006-97519 | 9/2006 |
| WO | WO 2006/018710 A1 | 2/2006 |
| WO | WO 2006/124951 | 11/2006 |

OTHER PUBLICATIONS

Love, D., "Grassmannian Beamforming for Multiple-Input Multiple-Output Wireless Systems", Oct. 2003, IEEE Transactions on Information Theory, vol. 49, No. 10, pp. 2735-2747.*

Korean Office Action issued Apr. 24, 2013 in counterpart Korean Application No. 10-2007-0036170 (5 pages, in Korean).

* cited by examiner

FIG. 1

METHOD FOR CODEBOOK DESIGN AND BEAMFORMING VECTOR SELECTION IN PER-USER UNITARY RATE CONTROL (PU2RC) SYSTEM

CROSS-REFERENCE TO RELATED APPLICATIONS

This application claims the benefit of U.S. Provisional Application No. 60/910,068 filed on Apr. 4, 2007, in the U.S. Patent and Trademark Office, and Korean Patent Application No. 2007-36170 filed on Apr. 12, 2007, in the Korean Intellectual Property Office, the disclosures of which are incorporated herein by reference in their entirety.

BACKGROUND OF THE INVENTION

1. Field of the Invention

Aspects of the invention relate to a mobile communication method of performing beamforming with respect to a terminal using a multi-antenna of a base station, and more particularly to a method of constructing a codebook, which is a group of beamforming vectors, and a method of selecting a beamforming vector from the codebook.

2. Description of the Related Art

Multi-user diversity is a scheme for communicating between a base station and a plurality of mobile terminals served by the base station that concentrates on transmitting data to only ones of the mobile terminals that have an excellent wireless channel state between the base station and the ones of the mobile terminal, and can thereby improve data transmission efficiency.

When a wireless channel state between a base station and a mobile terminal is excellent, data can be transmitted at a higher transmission speed. Conversely, when the wireless channel state between the base station and the mobile terminal is poor, the data transmission speed may be limited by the wireless channel, causing data to be transmitted at a comparatively lower transmission speed. Due to movement of the mobile terminal, fading, and the like, the wireless channel state varies over time. Accordingly, although the mobile terminal may have a poor wireless channel state at one point in time, it may have an excellent wireless channel state at another point in time.

Accordingly, if the base station can know the wireless channel state between the base station and the mobile terminal, the base station can concentrate on transmitting data to only a mobile terminal having an excellent wireless channel state, and thus the overall data transmission speed in the base station can be improved.

In order to provide an improved transmission speed between a base station and a mobile terminal, research is underway on a Multiple-Input Multiple-Output (MIMO) communication system in which the base station and the mobile terminal each have a plurality of antennas, and transmit and receive data using the plurality of antennas.

When using an independent wireless channel provided between the plurality of antennas, diversity gain can be achieved and thus a fading effect can be overcome. Also, when downlink beamforming is performed using an appropriate beamforming vector before transmitting data using the plurality of antennas, it is possible to concentrate on transmitting data to a mobile terminal located in a particular direction, and to restrict transmission of a signal to other mobile terminals located in other directions. Accordingly, an interference effect between downlink signals transmitted to a mobile terminal through downlink beamforming can be reduced, making it possible to transmit data at a high speed.

However, in the case of the downlink beamforming scheme, a number of nulls to eliminate the downlink interference is defined by a number of degrees of freedom, which is determined by a number of transmitting antennas. Accordingly, it is difficult to apply the downlink beamforming scheme in a general mobile communication environment in which a number of mobile terminals served by the base station is much greater than a number of transmitting antennas of the base station.

SUMMARY OF THE INVENTION

Aspects of the invention relate to a base station having a multi-antenna that uses an optimal codebook, which is a group of beamforming vectors used to perform beamforming.

Other aspects of the invention relate to a mobile terminal that selects a particular beamforming vector from an optimal codebook, which is a group of beamforming vectors used to perform beamforming, and reports the selected beamforming vector to a base station serving the mobile terminal.

Other aspects of the invention relate to a method of constructing an optimal codebook, which is a group of beamforming vectors used to perform beamforming, in a multi-antenna communication scheme.

According to an aspect of the invention, a base station includes a storage unit to store a codebook, wherein the codebook includes a plurality of matrices; a control unit to perform beamforming using the codebook to generate a signal; and a multi-antenna to transmit the signal; wherein for all of the plurality of matrices, all column vectors of a same matrix of the plurality of matrices are orthogonal to each other; and wherein for all columns of the plurality of matrices, all column vectors of a same column of all of the plurality of matrices satisfy a Grassmannian line packing (GLP) criterion.

According to an aspect of the invention, a mobile terminal includes a storage unit to store a codebook, wherein the codebook includes a plurality of matrices; a control unit to select one column vector from column vectors of the plurality of matrices, and to notify a base station serving the mobile terminal of the selected column vector; wherein for all of the plurality of matrices, all column vectors of a same matrix of the plurality of matrices are orthogonal to each other; and wherein for all columns of the plurality of matrices, all column vectors of a same column of all of the plurality of matrices satisfy a Grassmannian line packing (GLP) criterion.

According to an aspect of the invention, a communication method using a multi-antenna includes providing a codebook, wherein the codebook includes a plurality of matrices; performing beamforming using the codebook to generate a signal; and transmitting the signal via the multi-antenna; wherein for all of the plurality of matrices, all column vectors of a same matrix of the plurality of matrices are orthogonal to each other; and for all columns of the plurality of matrices, all column vectors of a same column of all of the plurality of matrices satisfy a Grassmannian line packing (GLP) criterion.

Additional aspects and/or advantages of the invention will be set forth in part in the description that follows and, in part, will be obvious from the description, or may be learned by practice of the invention.

BRIEF DESCRIPTION OF THE DRAWINGS

The above and/or other aspects and advantages of the invention will become apparent and more readily appreciated from the following description of embodiments of the invention, taken in conjunction with the accompanying drawings of which.

DETAILED DESCRIPTION

Reference will now be made in detail to embodiments of the invention, examples of which are shown in the accompanying drawings, wherein like reference numerals refer to like elements throughout. The embodiments are described below to explain the invention by referring to the figures.

Communication schemes currently under consideration are attempting to use a multi-antenna in a base station and a mobile terminal, and to concentrate on transmitting data to only a mobile terminal with an excellent downlink channel state, to achieve both beamforming gain and multi-user diversity gain. The multi-antenna consists of a plurality of antennas. Also, each of a plurality of mobile terminals served by the base station may measure the downlink channel state based on a pilot signal transmitted from the base station, and feed back the measured downlink channel state to the base station so that the base station can select a mobile terminal with an excellent downlink channel state from the mobile terminals. Also, the base station may perform downlink beamforming based on information fed back from the mobile terminals to improve data transmission efficiency. One such communication scheme is a per-user unitary rate control (PU2RC or $PU^2RC$) communication scheme.

Figure 1:
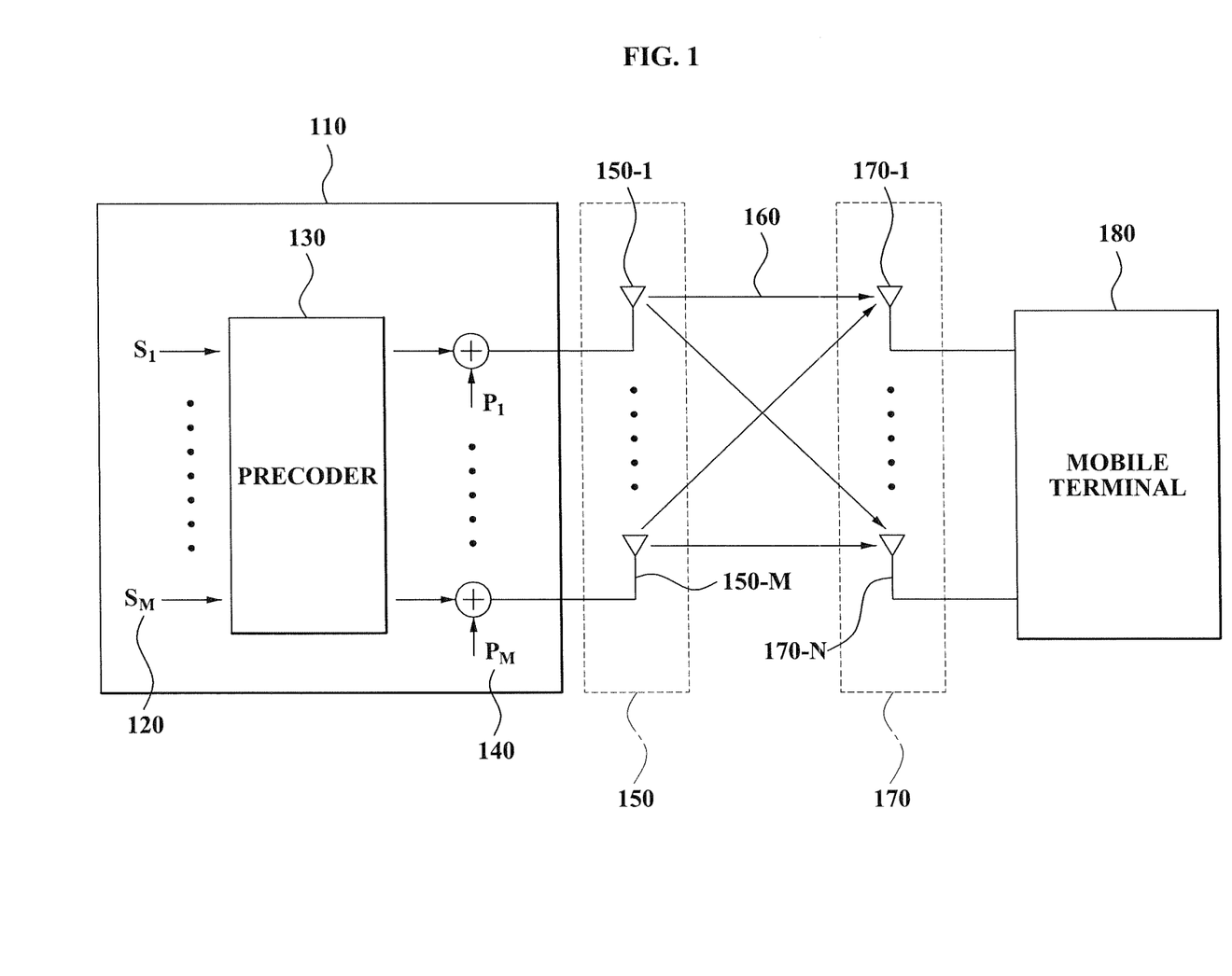
FIG. 1 shows an operation of mobile terminals measuring a downlink channel state using a pilot signal received from a base station via a multi-antenna of the base station according to an aspect of the invention.

FIG. 1 shows an operation of mobile terminals measuring a downlink channel state using a pilot signal received from a base station via a multi-antenna of the base station according to an aspect of the invention.

Referring to FIG. 1, M data signals 120 (S1, S2, ..., SM) to be transmitted from a base station 110 to mobile terminal 180 via a multi-antenna 150 of the base station 110 are inputted to a precoder 130 that performs beamforming using a beamforming vector. Also, M pilot signals 140 (P1, P2, ..., PM) to be transmitted from the base station 110 to the mobile terminal 180 via the multi-antenna 150 are inputted to the multi-antenna 150 without passing through the precoder 130. The multi-antenna 150 includes M transmitting antennas 150-1, ..., 150-M.

The mobile terminal 180 is served by the base station 110, and receives the pilot signals 140 (P1, P2, ..., PM) transmitted from the base station 110 via a multi-antenna 170 of the mobile terminal 180. The multi-antenna 170 includes N receiving antennas 170-1, ..., 170-N.

When the base station 110 includes the multi-antenna 150 consisting of the M transmitting antennas, and the mobile terminal 180 include the multi-antenna 170 consisting of the N receiving antennas, a total of M*N downlink channels 160 are provided between the base station 110 and the mobile terminal 180.

The pilot signals 140 (P1, P2, ..., PM) have known patterns and are orthogonal to each other, and the mobile terminal 180 knows the patterns of the pilot signals 140 (P1, P2, ..., PM). Accordingly, the mobile terminal 180 may readily measure the M*N downlink channel states of the M*N downlink channels 160, and also may readily select a beamforming vector from a codebook of the mobile terminal 180 to form an optimal beam pattern based on results of the measurement.

When beamforming is performed with respect to a particular mobile terminal using the M transmitting antennas 150-1, ..., 150-M, a beamforming vector corresponding to an M-dimensional column vector is needed. Also, an M*M square matrix is needed to simultaneously perform beamforming with respect to M mobile terminals with an excellent downlink channel state.

Accordingly, in a multi-antenna transmitting system to achieve multi-user diversity gain, a plurality of M*M square matrices is provided to form beams for a maximum of M mobile terminals. Any one matrix is selected from the plurality of square matrices based on the downlink channel state, and beamforming is performed with respect to the maximum of M mobile terminals using the selected matrix. Hereinafter, a group of matrices, which includes the plurality of M*M square matrices, is referred to as a codebook. Specifically, the codebook is a group of matrices that includes a plurality of matrices from which one matrix is selected to be a beamforming matrix used to perform beamforming with respect to the mobile terminal 180.

The mobile terminal 180 selects a beamforming vector from the codebook to form an optimal beam pattern, and feeds back a location of the selected beamforming vector in the codebook and a downlink channel quality indicator (CQI) to the base station 110. The downlink CQI indicates the quality of a downlink channel when the selected beamforming vector is used to form an optimal beam pattern. For example, the location of the selected beamforming vector in the codebook may be an index of the selected beamforming vector, and the downlink CQI may be a signal-plus-interference to noise ratio (SINR).

Figure 2:
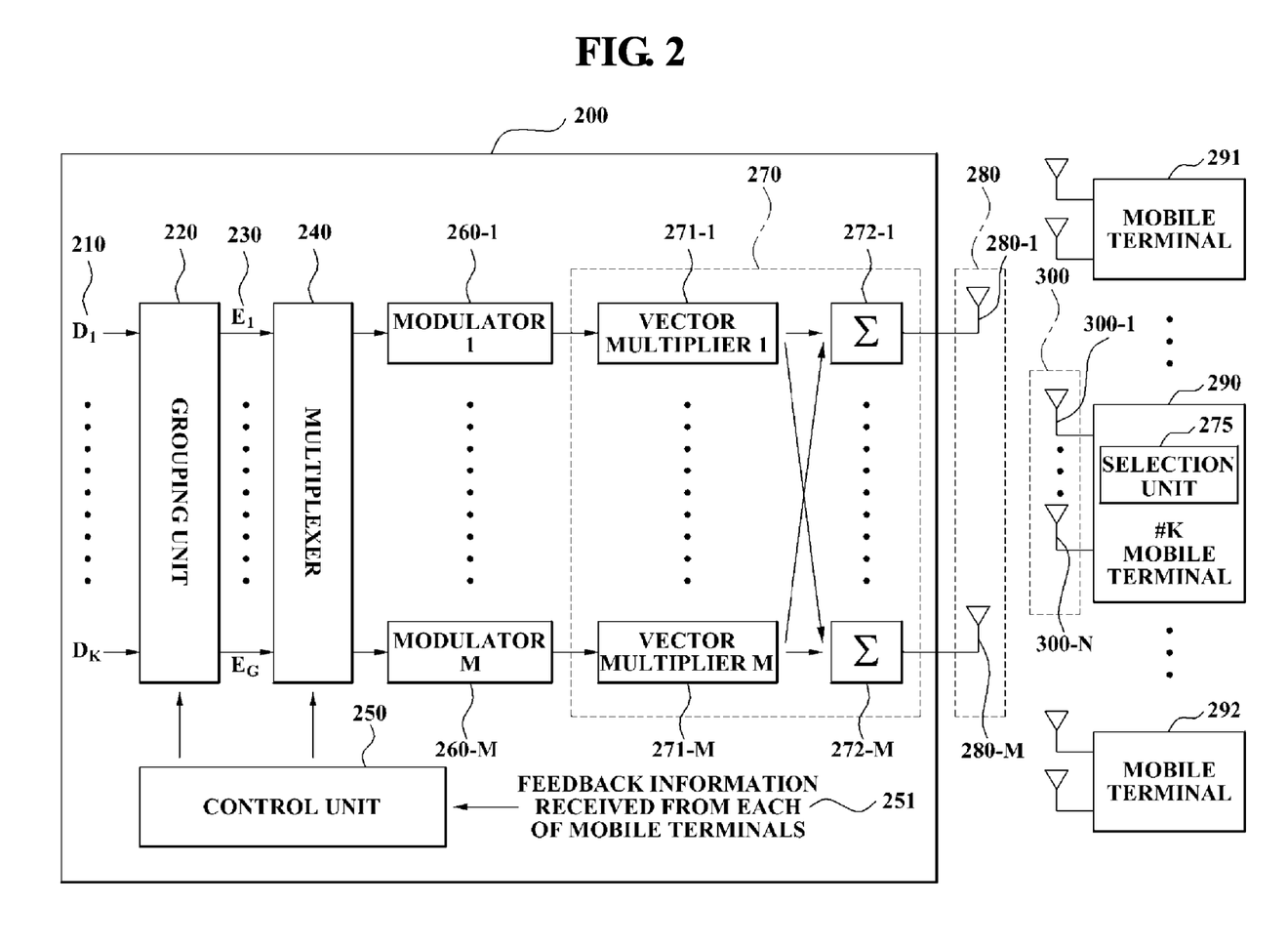
FIG. 2 shows a configuration of a transmitter of a base station that performs downlink beamforming using a codebook with respect to data to be transmitted to mobile terminals according to an aspect of the invention.

FIG. 2 shows a configuration of a transmitter of a base station that performs downlink beamforming using a codebook with respect to data to be transmitted to mobile terminals according to an aspect of the invention.

Referring to FIG. 2, K mobile terminals 290 are served by a base station 200. K data signals 210 (D1, D2, ..., DK) to be transmitted to the K mobile terminals 290 are grouped into G data signal groups 230 (E1, E2, ..., EG) each including selected ones of the K data signals 210 by a grouping unit 220 of the base station 200 under control of a control unit 250 of the base station 200 based on feedback information 251 received from each of the K mobile terminals 290. G is a number of beamforming matrices included in the codebook. Since the K mobile terminals 290 are grouped into G mobile terminal groups corresponding to the G data signal groups 230 based on a beamforming matrix that includes a beamforming vector whose location is fed back from each of the mobile terminals 290, data signals 210 in the same data signal group 230 may be beamformed using the same beamforming matrix.

The base station 200 may perform beamforming using only one matrix of the G matrices of the codebook. Accordingly, the control unit 250 of the base station 200 selects any one of the G data signal groups 230 so that a total sum of data transmission rates from the base station 200 to the mobile terminals 290 belonging to the corresponding one of the G mobile terminal groups may be maximized when beamforming is performed with respect to the mobile terminals 290 belonging to the corresponding one of the G mobile terminal groups using a corresponding matrix of the codebook. The K data signals 210 and the K mobile terminals 290 are grouped into the G data signal groups 230 and the G mobile terminal groups based on the feedback information 251 received from each of the mobile terminals 290, that is, the location of the selected beamforming vector in the codebook and the downlink CQI that are fed back from each of the mobile terminals 290.

In a communication scheme using a multi-antenna 280 including M transmitting antennas 280-1, ..., 280-M in the base station 200 and a multi-antenna 300 including N receiving antennas 300-1, ..., 300-N in each of the K mobile terminals 290, data needs to be transmitted to a maximum number M of the K mobile terminals 290 with an excellent downlink channel state at any one time by performing beamforming to achieve multi-user diversity gain. The multi-antenna 280 includes M transmitting antennas 280-1, ..., 280-M. For the above operation, when each of the K mobile terminals 290 measures the downlink channel state and feeds back results of the measurement to the base station 200, the control unit 250 of the base station 200 selects the maximum number M of mobile terminals 290 from the K mobile terminals 290 so as to maximize the downlink data transmission speed in the base station 200.

More specifically, the base station 200 including the multi-antenna 280 including the M transmitting antennas 280-1, ..., 280-M transmits a pilot signal, and each of the mobile terminals 290 served by the base station 200 including the multi-antenna 300 including the N receiving antennas 300-1, ..., 300-N receives the pilot signal transmitted from the base station 200 and measures the downlink channel state using the received pilot signal. While the base station 200 performs beamforming using each of the column vectors of each of the matrices of the codebook included in the mobile terminals 290 as a beamforming vector, each of the mobile terminals 290 calculates the quality of the downlink channel and generates a downlink CQI for each of the column vectors. Each of the mobile terminals 290 selects an optimal column vector from each of the matrices in the codebook, and feeds back the location of the selected column vector in the codebook and the corresponding downlink CQI obtained by performing beamforming using the selected column vector to the base station 200 in a selected one of various types of feedback modes. For example, in a full feedback mode, each of the mobile terminals 290 may feed back the location of the selected column vector for each of the matrices in the codebook and the corresponding downlink CQI to the base station 200. Thus, if there are four matrices in the codebook, each of the mobile terminals 290 may feed back the locations of four selected column vectors, one for each of the four matrices, and four corresponding downlink CQIs to the base station 200. Alternatively, in a single feedback mode, to reduce an amount of feedback information, each of the mobile terminals 290 may feed back only a location of the selected column vector that provides an optimal downlink CQI among all of the selected column vectors and the corresponding downlink CQI to the base station 200. Thus, if there are four matrices in the codebook and the selected column vector of the second matrix provides an optimal downlink CQI among all of the selected column vectors of the four matrices, each of the mobile terminals 290 may feed back only the location of the selected column vector in the second matrix and the corresponding downlink CQI to the base station 200.

The base station 200 selects the maximum number M of mobile terminals 290 from the K mobile terminals 290 so as to maximize the downlink data transmission rate in the base station 200 based on the location of the beamforming vector in the codebook and the downlink CQI received from each of the mobile terminals 290.

An example will now be described in which it is assumed that five mobile terminals are served by a base station.

Specifically, it is assumed that a first mobile terminal will have the best performance when the base station performs downlink beamforming using a first column vector of a first matrix of a codebook, a second mobile terminal will have the best performance when the base station performs downlink beamforming using a third column vector of the first matrix of the codebook, a third mobile terminal will have the best performance when the base station performs downlink beamforming using a first column vector of a second matrix of the codebook, a fourth mobile terminal will have the best performance when the base station performs downlink beamforming using a fourth column vector of the second matrix of the codebook, and a fifth mobile terminal will have the best performance when the base station performs downlink beamforming using a third column vector of the first matrix of the codebook.

In this example, the second mobile terminal and the fifth mobile terminal will have the best performance when the base station performs downlink beamforming using the same column vector, i.e., the third column vector of the first matrix of the codebook, and thus their performances must be compared to determine provides the better performance. Thus, for example, if the result of a comparison between the downlink CQIs fed back from the second mobile terminal and the fifth mobile terminal reveals that the better performance is obtained when the base station performs beamforming with respect to the second mobile terminal, the base station must abandon beamforming with respect to the fifth mobile terminal.

The first mobile terminal and the second mobile terminal both use a column vector selected from the first matrix of the codebook, and thus are classified into a first group. The third mobile terminal and the fourth mobile terminal both use a column vector selected from the second matrix of the codebook, and thus are classified into a second group.

The base station 200 determines whether downlink beamforming should be performed with respect to the first group or the second group to maximize the data transmission rate based on the downlink CQI received from each of the mobile terminals.

When the base station 200 determines that downlink beamforming should be performed with respect to the first group, the base station 200 performs downlink beamforming with respect to the first mobile terminal using the first column vector of the first matrix of the codebook, and performs downlink beamforming with respect to the second mobile terminal using the third column vector of the first matrix of the codebook. Alternatively, when the base station 200 determines that downlink beamforming should be performed with respect to the second group, the base station 200 performs downlink beamforming with respect to the third mobile terminal using the first column vector of the second matrix of the codebook, and performs downlink beamforming with respect to the fourth mobile terminal using the fourth column vector of the second matrix of the codebook.

The data signal groups 230 (E1, E2, ..., EG) are inputted to a multiplexer 240 of the base station 200. The multiplexer 240 selects one data signal group to be transmitted from the data signal groups 230 under control of the control unit 250, which decides which data signal group is to be selected based on the feedback information 251 received from each of the mobile terminals 290. The data signals of the selected data signal group are outputted from the multiplexer 240 and inputted to M modulators 260-1, ..., 260-M that adaptively modulate the data signals of the selected data signal group based on the downlink channel state and output M adaptively modulated data signals.

The adaptively modulated data signals are inputted to a precoder 270 of the base station 200. The precoder 270 includes M vector multipliers 271-1, ..., 271-M, and M summers 271-2 ... 272-M. Each of the vector multipliers 271-1 ... 271-M multiplies a respective one of the adaptively modulated data signals by a corresponding beamforming vector selected from a beamforming matrix selected from a codebook. Each of the summers sums corresponding products output from the vector multipliers 271-1, ..., 271-M, thereby generating M beamformed signals that are inputted to the M transmitting antennas 280-1, ..., 280-M of the multi-antenna 280, which transmit the beamformed signals to corresponding ones of the K mobile terminals 290. More specifically, the first summer 272-1 sums the products of the M adaptively modulated data signals and the first terms of the beamforming vectors that are output from the M vector modulators 271-1, ..., 271-M. The second summer 272-2 sums the products of the M adaptively modulated data signals and the second terms of the beamforming vectors that are output from the vector modulators 271-1, ..., 271-M. The rest of the summers 272-3, ..., 272-M operate in a similar fashion, with the M-th summer 272-M summing the products of the M adaptively modulated data signals and the M-th terms of the beamforming vectors that are output from the vector modulators 271-1, ..., 271-M.

Thus, the user data signals that are transmitted from the base station 200 to corresponding ones of the mobile terminals 290 via the downlink are beamformed in the precoder 270, and thus the transmission performance of the downlink is determined depending on a selection of a beamforming matrix used to perform the beamforming. Specifically, a method used to generate a codebook, which is a group of beamforming matrices, determines the performance of the multi-antenna communication scheme.

A different column vector selected from a plurality of column vectors constituting a beamforming matrix is used as a beamforming vector for each of the mobile terminals 290, and a downlink beam formed by a beamforming vector corresponding to a particular mobile terminal must reduce interference with any other mobile terminal. Accordingly, column vectors in a same beamforming matrix must be orthogonal to each other, and a signal strength should not change during a signal transmission process via the M transmitting antennas 280-1, ..., 280-M. Accordingly, the magnitude of the beamforming vector should be '1'.

When all of the beamforming matrices constituting the codebook used in the base station 200 are M*M square matrices, and column vectors of a same beamforming matrix are orthogonal to each other and have a magnitude of '1', discrete Fourier transformed (DFT) basis vectors may be used as the column vectors of the beamforming matrix.

Accordingly, $e_m^{(g)}$, which is an m-th column vector of a g-th beamforming matrix of the codebook is given by the following Equation 1:

$$e_m^{(g)} = \frac{1}{\sqrt{M}} \left[ w_{0m}^{(g)} \ \ldots \ w_{(M-1)m}^{(g)} \right]^T \quad (1)$$

$$w_{nm}^{(g)} = \exp\left\{ j \frac{2\pi n}{M} \left( m + \frac{g}{G} \right) \right\}$$

where M is a number of transmitting antennas 280-1, ..., 280-M provided in the base station 200, and $w_{nm}^{(g)}$ is an n-th element of an m-th column vector of a g-th beamforming matrix of the codebook.

For example, when there are two transmitting antennas 280-1, ..., 280-M provided in the base station 200, the codebook may be expressed by the following Equation 2:

$$\left\{ E_0 = \frac{1}{\sqrt{2}} \begin{bmatrix} 1 & 1 \\ 1 & -1 \end{bmatrix}, E_1 = \frac{1}{\sqrt{2}} \begin{bmatrix} 1 & 1 \\ j & -j \end{bmatrix} \right\} \quad (2)$$

The codebook generated using the DFT basis vectors may satisfy a basic requirement for the codebook. However, when performing beamforming using the codebook, the downlink performance may be poor.

In order to maximize the downlink performance, the beamforming vector used to perform beamforming with respect to a particular mobile terminal must be determined by searching the entire M-dimensional vector space. However, it is impossible to search the entire M-dimensional vector space, and thus a search may be performed with respect to only a limited number of column vectors of the codebook.

As an example of a second best scheme, when the limited number of column vectors of the codebook are evenly distributed throughout the entire M-dimensional vector space, each of the mobile terminals 290 may measure the downlink channel state using a pilot signal transmitted from the base station 200, and may select a beamforming vector with a comparatively excellent performance even though it may not be able to select an optimal beamforming vector. Conversely, when the limited number of column vectors of the codebook are densely distributed in only a portion of the M-dimensional vector space, each of the mobile terminals 290 may not be able find a beamforming vector with an excellent performance even it searches the entire codebook.

A plurality of vectors that satisfy a Grassmannian line packing (GLP) criterion is a group of vectors that are spaced apart from each other by a distance greater than a predetermined amount. Specifically, the plurality of vectors that satisfy the GLP criterion may be assumed to be vectors that are evenly distributed to some extent in the M-dimensional vector space.

Based on the condition of the beamforming matrix capable of constituting the codebook, and the condition of constituting the codebook with vectors that are evenly distributed in the M-dimensional vector space, in order for a codebook including a plurality of matrices to be an optimal codebook capable of maximizing the downlink data transmission rate, for all of the plurality of matrices of the codebook, all column vectors of a same matrix of the plurality of matrices must be orthogonal to each other, and for all columns of the plurality of matrices of the codebook, all column vectors of a same column of all of the plurality of matrices must satisfy a GLP criterion given by the following Equation 3:

$$\min_{1 \leq k \leq l \leq K} \sqrt{1 - |w_{k,n}^H w_{l,n}|^2} = \sin(\theta_{min}^n) \quad (3)$$

where $w_{k,n}$ is an n-th column vector of a k-th matrix, $w_{l,n}$ is an n-th column vector of an l-th matrix, and $\theta_{min}^n$ is a minimum angle between the n-th column vectors.

The condition that for all of the plurality of matrices of the codebook, all column vectors of a same matrix of the plurality of matrices must be orthogonal to each other is a condition in which all column vectors of the first matrix are orthogonal to each other, all column vectors of the second matrix are orthogonal to each other, and so on for all remaining matrices of the plurality of matrices.

The condition that for all columns of the plurality of matrices of the codebook, all column vectors of a same column of all of the plurality of matrices must satisfy a GLP criterion given by Equation 3 above is a condition in which all column vectors of a first column of all of the plurality of matrices satisfy the GLP criterion, all column vectors of a second column of all of the plurality of matrices satisfy the GLP criterion, and so on for all remaining columns of the plurality of matrices.

Even if all column vectors of a same matrix of the plurality of matrices of the codebook do not satisfy the GLP criterion, all column vectors of a same column of all of the plurality of matrices of the codebook satisfy the GLP criterion. Also, all column vectors of a same matrix of the plurality of matrices of the codebook are orthogonal to each other. Accordingly, the codebook generated by the above scheme may be the best option in a communication system to achieve multi-user diversity gain.

In general, a simple method of obtaining a group of vectors that satisfy the GLP criterion is unknown. In order to generate the codebook, a group of G*M M-dimensional column vectors must be obtained. These G*M column vectors are grouped into G matrices, i.e. a plurality of matrices, each including M M-dimensional column vectors, i.e., G M*M square matrices. According to an aspect of the invention, for all of the plurality of matrices, all column vectors of a same matrix of the plurality of matrices are orthogonal to each other, and for all columns of the plurality of matrices, all column vectors of a same column of all of the plurality of matrices satisfy the GLP criterion.

The codebook may be generated using a sequential scheme, which may include designating a first plurality of column vectors as first column vectors of the plurality of matrices, wherein the first plurality of column vectors satisfy the GLP criterion, generating a second plurality of column vectors based on the first plurality of column vectors and designating the second plurality of column vectors as second column vectors of the plurality of matrices, wherein the second plurality of column vectors are orthogonal to the first plurality of column vectors in a same matrix and satisfy the GLP criterion. And generating a third plurality of column vectors based on the first plurality of column vectors and the second plurality of column vectors and designating the third plurality of column vectors as third column vectors of the plurality of matrices, wherein the third plurality of column vectors are orthogonal to the first plurality of column vectors in a same matrix and the second plurality of column vectors in a same matrix and satisfy the GLP criterion, and so on until all of the column vectors of the plurality of matrices have been generated. However, it is understood that variations of this sequential method may be used according to other aspects of the invention.

When the multi-antenna 280 of FIG. 2 consists of only two transmitting antennas, the codebook may be generated using a simple scheme.

In this simple scheme, a plurality of column vectors that satisfy the GLP criterion are designated as first column vectors of the plurality of matrices included in the codebook.

A second column vector of each of the plurality of matrices may be generated by multiplying the first column vector of each of the plurality of matrices by a rotation matrix according to the following Equation 4:

$$w_{k,2} = \begin{bmatrix} 0 & 1 \\ -1 & 0 \end{bmatrix} w_{k,1}^* \quad (4)$$

where $w_{k,1}$ is the first column vector of a k-th matrix of the plurality of matrices that satisfies the GLP criterion with respect to the first column vectors of all other matrices of the plurality of matrices, and $w_{k,2}$ is the second column vector of the k-th matrix generated by multiplying $w_{k,1}$ by the rotation matrix.

The base station 200 and the mobile terminals 290 use the same codebook. Accordingly, when each of the mobile terminals 290 feeds back only a location of a beamforming vector in the codebook to the base station 200, the base station 200 may accurately determine the beamforming vector. The beamforming vector is determined based on the downlink channel state. However, it is understood that the beamforming vector may be determined based on other criteria according to other aspects of the invention.

Accordingly, when each of the mobile terminals 290 including a selection unit 275 selects the beamforming vector with the optimal downlink performance from the codebook in which all column vectors of a same matrix of the plurality of matrices of the codebook are orthogonal to each other, and all column vectors of a same column of all of the matrices of the codebook satisfy a GLP criterion, and feeds back only the location of the beamforming vector with the optimal downlink performance in the codebook to the base station 200, an amount of feedback information from each of the mobile terminals 290 to the base station 200 may be significantly reduced.

Since the base station 200 and the mobile terminals 290 use the same codebook, the base station 200 may select a beamforming vector from the codebook based on the location of the beamforming vector in the codebook fed back from each of the mobile terminals 290, and perform beamforming via the multi-antenna 280. Accordingly, it is possible to improve the downlink data transmission rate from the base station 200 to the mobile terminals 290.

As described above, the mobile terminals 290 are classified into G groups depending on which beamforming matrix is used in the base station 200, so that the same beamforming matrix is used for all of the mobile terminals 290 in the same group, and different beamforming matrices are used for different groups. As a result, if a plurality of mobile terminals 290 in the same group selects a same column vector, that same column vector will be a same column vector of the same matrix, and therefore only one of the mobile terminals 290 that have selected the same column vector may receive data through downlink beamforming. Accordingly, the other ones of the mobile terminals 290 that have selected the same vector are excluded from the most preferential data transmission targets.

Therefore, each of the plurality of mobile terminals 290 in the same group must select a different column vector for downlink data transmission.

According to an aspect of the invention, each of a plurality of mobile terminals served by a base station selects a different column vector of a same matrix of a codebook as a beamforming vector. The base station may restrict the range of column vectors that each of the plurality of mobile terminals served by the base station can select. For example, the base station may restrict each of the mobile terminals to selecting a column vector from only a portion of the codebook, instead of selecting the column vector from the entire codebook. To accomplish this, the control unit of the base station may divide the entire codebook into portions each assigned to one or more of the mobile terminals, so that each of the mobile terminals can select a column vector from only a portion of the codebook, while all of the mobile terminals considered as a whole can select column vectors from the entire codebook. Also, the mobile terminal may restrict the range of column vectors that the mobile terminal can select based on a command received by the mobile terminal from the base station.

Accordingly, the ranges of column vectors that the mobile terminals can select may be uniformly distributed in the plurality of matrices, thereby improving downlink data transmission performance.

As an example of a method in which a base station may divide a codebook including a plurality of matrices into portions from which each of a plurality of mobile terminals served by the base station can select a column vector, a control unit of the base station may restrict the range of column vectors that each of the plurality of mobile terminals served by the base station can select to a portion of column vectors of the plurality of matrices of the codebook. As a result of this restriction, each of the mobile terminals can select a beamforming vector from only the portion of column vectors of the plurality of matrices of the codebook.

According to an aspect of the invention, the control unit of the base station may restrict the range of column vectors that each of the mobile terminals can select based on a mobile terminal identifier. Also, the control unit may restrict the range of column vectors that each of the mobile terminals can select to a portion of column vectors of the plurality of matrices of the codebook based on the mobile terminal identifier.

The mobile terminal identifier may be a character string that enables the base station to identify a corresponding mobile terminal from the mobile terminals served by the base station. As a simple example, a telephone number assigned to the mobile terminal may be used as the mobile terminal identifier. Also, an Electronic Serial Number (ESN) of a Code Division Multiple Access (CDMA) mobile communication scheme, an International Mobile Equipment Identity (IMEI) of a Global System for Mobile Communications (GSM) mobile communication scheme, and the like may be used as the mobile terminal identifier. Also, a unique value of the mobile terminal may be used as the mobile terminal identifier. Also, the mobile terminal identifier may be a random value generated by the mobile terminal. Also, the mobile terminal identifier may be a value assigned by the base station, and in this case, the base station needs to transmit the assigned mobile terminal identifier to the corresponding mobile terminal via a transmitter. However, it is understood that other types of mobile terminal identifiers may be used according to other aspects of the invention.

As an example of a base station assigning a unique identifier to each of a plurality of mobile terminals, the base station may determine the unique identifier based on an order in which each of the mobile terminals accesses the base station. Also, the unique identifier may be randomly generated, and assigned to each of the mobile terminals so that no identifier is duplicated.

Also, the range of column vectors that each of the mobile terminals can select may be determined based on the assigned identifier. For example, the base station may select a particular column vector of a beamforming matrix of the codebook as a beamforming vector based on a remainder obtained by dividing the assigned identifier by a number of transmitting antennas of the multi-antenna of the base station. A number of transmitting antennas of the base station is identical to a number of beamforming matrices of the codebook. Accordingly, when the range of column vectors is determined based on the remainder, all of the column vectors of the beamforming matrices are evenly selected by the mobile terminals, instead of a particular column vector being frequently selected. For example, when the base station assigns mobile terminal identifiers based on an order in which each of a plurality of mobile terminals accesses the base station, and a multi-antenna of the base station has four transmitting antennas, the first, fifth, ninth, thirteenth, . . . mobile terminals that access the base station in that order must select only a first column vector of the beamforming matrices of the codebook as the beamforming vector. In this example, the assigned identifiers of the mobile terminals are 1, 5, 9, 13, . . . , and the remainder obtained by dividing these assigned identifiers by 4 (the number of transmitting antennas of the base station) is 1, indicating that only a first column vector must be selected. The second, sixth, tenth, fourteenth, . . . mobile terminals that access the base station in that order must select only a second column vector of the beamforming matrices of the codebook as the beamforming vector. The third, seventh, eleventh, fifteenth, . . . mobile terminals that access the base station in that order must select only a third column vector of the beamforming matrices of the codebook as the beamforming vector. The fourth, eighth, twelfth, sixteenth, . . . mobile terminals that access the base station in that order must select only a fourth column vector of the beamforming matrices of the codebook as the beamforming vector. When all of the column vectors of the beamforming matrices are evenly selected, it is possible to prevent the mobile terminals from frequently selecting the same column vector of the same beamforming matrix as the beamforming vector, which improves the downlink data transmission performance.

A computer-readable medium may be encoded with processing program instructions for implementing a communication method using a multi-antenna according to an aspect of the invention performed by a computer. The computer-readable medium may also be encoded with data files, data structures, and the like in addition to the processing instructions for implementing a communication method using a multi-antenna. Examples of suitable computer-readable media include magnetic media such as hard disks, floppy disks, and magnetic tape; optical media such as CD-ROMs and DVDs; magneto-optical media such as magneto-optical disks; and hardware devices that are specially configured to store and perform processing instructions, such as read-only memory (ROM), random access memory (RAM), flash memory, and the like. The processing instructions may also be embodied as a computer data signal in a carrier wave for transmission over a transmission medium such as optical or metallic lines, waveguides, the Internet, air, space, and the like. The computer data signal may also include data files, data structures, and the like in addition to the processing instructions for implementing a communication method using a multi-antenna. Examples of processing instructions include both machine code, such as machine code produced by a compiler, and higher level code that may be executed by the computer using an interpreter. The above-described hardware devices may be configured to act as one or more software modules to perform the operations of the above-described aspects of the invention.

According to aspects of the invention, a base station having a multi-antenna uses an optimal codebook, which is a group of beamforming vectors used to perform beamforming.

Also, according to aspects of the invention, a mobile terminal selects a particular beamforming vector from an optimal codebook, which is a group of beamforming vectors used to perform beamforming, and reports the selected beamforming vector to a base station serving the mobile terminal.

Also, according to aspects of the invention, an optimal codebook, which is a group of beamforming vectors used to perform beamforming, is constructed for use in a multi-antenna communication scheme.

Although several embodiments of the invention have been shown and described, it would be appreciated by those skilled in the art that changes may be made to these embodiments without departing from the principles and spirit of the invention, the scope of which is defined by the claims and their equivalents.

What is claimed is:

1. A base station, comprising:
a grouping unit configured to group a plurality of data signals into a plurality of data signal groups, each of the data signal groups comprising selected ones of the plurality of data signals;
a multiplexer configured to select one of the data signal groups to be transmitted by performing beamforming;
a control unit configured to control the grouping unit and the multiplexer to perform beamforming using a codebook to generate a signal, the codebook comprising a plurality of matrices;
a multi-antenna configured to transmit the data signal; and
a codebook generator configured to generate the codebook, wherein:
the codebook is generated by following requirements of:
(1) for all of the plurality of matrices, all column vectors of the same matrix of the plurality of matrices are orthogonal to each other,
(2) for all columns of the plurality of matrices, each column vector of all of the plurality of matrices of the same column is spaced apart from each other by a distance greater than a predetermined amount, and
(3) each of a plurality of mobile terminals, which corresponds to a group served by the base station, corresponds to a different column vector of the same matrix, and
the codebook generator is further configured to:
designate a plurality of column vectors as first column vectors of the plurality of matrices, the plurality of column vectors being configured to satisfy a Grassmannian line packing (GLP) criterion; and
generate a second column vector of each of the matrices by multiplying the first column vector of each of the matrices by a rotation matrix according to the following equation:

$$w_{k,2} = \begin{bmatrix} 0 & 1 \\ -1 & 0 \end{bmatrix} w_{k,1}^*,$$

where $w_{k,1}$ is the first column vector of a k-th matrix of the plurality of matrices that satisfies the GLP criterion with respect to the first column vectors of all other matrices of the plurality of matrices, and $w_{k,2}$ is the second column vector of the k-th matrix generated by multiplying $w_{k,1}$ by the rotation matrix.

2. The base station of claim 1, wherein the control unit is further configured to:
assign a different identifier to each of the mobile terminals; and
restrict the range of column vectors based on the assigned identifier.

3. The base station of claim 2, further comprising:
a transmitter configured to transmit the assigned identifier to each of the mobile terminals.

4. The base station of claim 2, wherein the control unit is further configured to determine the assigned identifier according to an order in which each of the plurality of mobile terminals accesses the base station.

5. The base station of claim 2, wherein the control unit is further configured to randomly assign the assigned identifier to each of the mobile terminals.

6. The base station of claim 2, further comprising:
a multi-antenna comprising a plurality of transmitting antennas,
wherein the control unit is further configured to restrict the range of column vectors based on a remainder obtained by dividing the assigned identifier by the number of transmitting antennas of the multi-antenna.

7. A communication method using a multi-antenna, the method comprising:
providing a codebook, the codebook including a plurality of matrices;
grouping a plurality of data signals into a plurality of data signal groups, each of the data signal groups comprising selected ones of the plurality of data signals;
selecting one of the data signal groups to be transmitted by performing beamforming;
performing beamforming using the codebook to generate a signal, the performing of the beamforming comprising controlling the grouping of the plurality of data signals and the selecting of the one of the data signal groups; and
transmitting the data signal via the multi-antenna, wherein:
the codebook is generated by following requirements of:
(1) for all of the plurality of matrices, all column vectors of the same matrix of the plurality of matrices are orthogonal to each other,
(2) for all columns of the plurality of matrices, each column vector of all of the plurality of matrices of the same column is spaced apart from each other by a distance greater than a predetermined amount, and
(3) each of a plurality of mobile terminals, which corresponds to a group served by a base station, corresponds to a different column vector of the same matrix,
the multi-antenna comprises two transmitting antennas that are an entirety of the transmitting antennas of the multi-antenna, and
the providing of the codebook comprises generating the codebook, the generating of the codebook comprising:
designating a plurality of column vectors as first column vectors of the plurality of matrices, the plurality of column vectors being configured to satisfy a Grassmannian line packing (GLP) criterion; and
generating a second column vector of each of the matrices by multiplying the first column vector of each of the matrices by a rotation matrix according to the following equation:

$$w_{k,2} = \begin{bmatrix} 0 & 1 \\ -1 & 0 \end{bmatrix} w_{k,1}^*,$$

where $w_{k,1}$ is the first column vector of a k-th matrix of the plurality of matrices that satisfies the GLP criterion with respect to the first column vectors of all other matrices of the plurality of matrices, and $w_{k,2}$ is the second column vector of the k-th matrix generated by multiplying $w_{k,1}$ by the rotation matrix.

8. The method of claim 7, wherein the generating of the codebook further comprises
generating additional column vectors of each of the matrices based on the first and second column vectors of each of the matrices until an entirety of column vectors of the plurality of matrices have been generated.

9. The method of claim 7, wherein the base station is configured to perform the providing of the codebook, the grouping of the plurality of data signals, the selecting of the one of the data signal groups, the performing of the beamforming, and the transmitting of the signal.

10. A non-transitory computer-readable medium encoded with processing instructions for implementing a communication method using a multi-antenna performed by a computer, the method comprising:
  providing a codebook, the codebook including a plurality of matrices;
  grouping a plurality of data signals into a plurality of data signal groups, each of the data signal groups comprising selected ones of the plurality of data signals;
  selecting one of the data signal groups to be transmitted by performing beamforming;
  performing beamforming using the codebook to generate a signal, the performing of the beamforming comprising controlling the grouping of the plurality of data signals and the selecting of the one of the data signal groups; and
  transmitting the data signal via the multi-antenna, wherein:
  the codebook is generated by following requirements of:
    (1) for all of the plurality of matrices, all column vectors of the same matrix of the plurality of matrices are orthogonal to each other,
    (2) for all columns of the plurality of matrices, each column vector of all of the plurality of matrices of the same column is spaced apart from each other by a distance greater than a predetermined amount, and
    (3) wherein each of a plurality of mobile terminals, which corresponds to a group served by a base station, corresponds to a different column vector of the same matrix,
  the multi-antenna comprises two transmitting antennas that are an entirety of the transmitting antennas of the multi-antenna, and
  the providing of the codebook comprises generating the codebook, the generating of the codebook comprising:
    designating a plurality of column vectors as first column vectors of the plurality of matrices, the plurality of column vectors being configured to satisfy a Grassmannian line packing (GLP) criterion; and
    generating a second column vector of each of the matrices by multiplying the first column vector of each of the matrices by a rotation matrix according to the following equation:

$$w_{k,2} = \begin{bmatrix} 0 & 1 \\ -1 & 0 \end{bmatrix} w_{k,1}^*,$$

where $w_{k,1}$ is the first column vector of a k-th matrix of the plurality of matrices that satisfies the GLP criterion with respect to the first column vectors of all other matrices of the plurality of matrices, and $w_{k,2}$ is the second column vector of the k-th matrix generated by multiplying $w_{k,1}$ by the rotation matrix.

11. The base station of claim 1, wherein a number of antennas of the multi-antenna is less than or equal to a total number of mobile terminals served by the base station.

12. The base station of claim 1, wherein the control unit performs beamforming using a portion of the codebook to generate the signal.

* * * * *